UNITED STATES PATENT OFFICE.

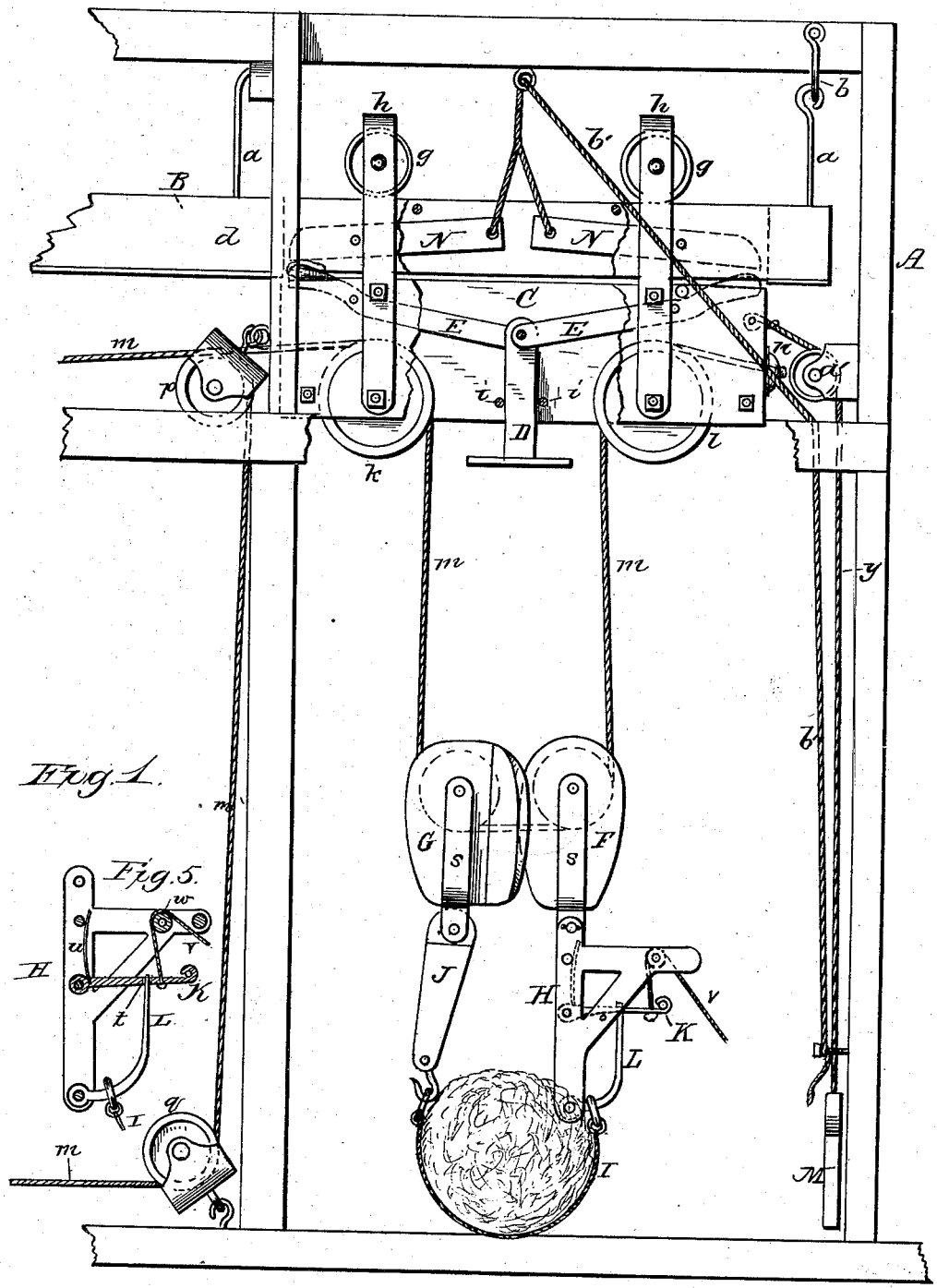

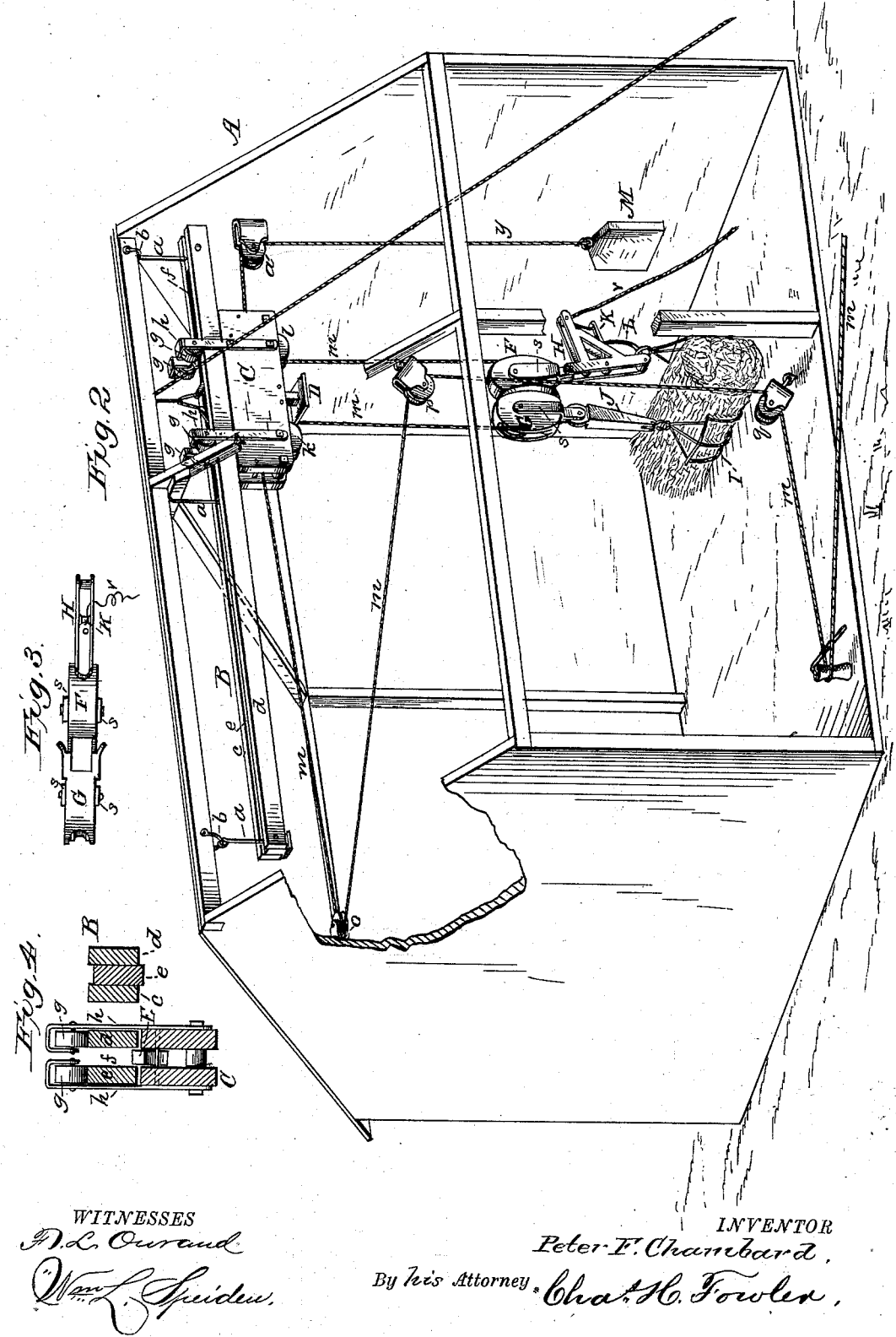

PETER F. CHAMBARD, OF FAYETTE, OHIO.

HAY-ELEVATOR.

SPECIFICATION forming part of Letters Patent No. 254,921, dated March 14, 1882.

Application filed February 14, 1882. (No model.)

*To all whom it may concern:*

Be it known that I, PETER F. CHAMBARD, a citizen of the United States, residing at Fayette, in the county of Fulton and State of Ohio, have invented certain new and useful Improvements in Hay-Elevators; and I do hereby declare that the following is a full, clear, and exact description of the same, reference being had to the annexed drawings, making a part of this specification, and to the letters and figures of reference marked thereon.

Figure 1 of the drawings is a side elevation of my invention; Fig. 2, a perspective view of the same. Fig. 3 is a detail view of the double pulley-blocks. Fig. 4 is a sectional view of the carriage, and Fig. 5 is a detail view of the tripping device.

The present invention has relation to certain new and useful improvements in hay-elevators; and the object thereof is to provide a simple and effective device or means by which the hay, straw, grain, or any farm crop can be conveniently and expeditiously taken from the wagon by a suitable sling or harness, or by a fork, and deposited where required in the barn. This object I attain by the construction substantially as shown in the drawings and hereinafter described.

In the accompanying drawings, A represents the frame-work of an ordinary barn, to the rafters or ridge-pole of which is suspended a track, B, by rods $a$ and clevis $b$.

The track B is composed of two outer timbers, $c\ d$, and an inner or center timber, $e$, connected together, as shown in Fig. 4, the center timber or section, $e$, extending only a portion of the length of the track, so as to leave a space, $f$, between the outer sections, $c\ d$, for the purpose hereinafter described.

The carriage C is suspended upon the track B by rollers $g$, having its bearings upon short axles connected to the upper ends of hangers $h$, secured to the outer sides of the carriage. These hangers, as will be seen by reference to Fig. 4, are each formed of a single piece of metal, bent horizontally at their upper ends a short distance in an inward direction, and then in a direction downward, thereby forming a strong and durable hanger and a firm support for the inner ends of the short axles.

Within the carriage C is located a suitable trip-lever, D, to the upper end of which are pivoted the inner ends of latch-arms E, said arms near their outer ends being pivoted to the inner sides of the carriage, as shown in Fig. 1. That portion of the outer ends of the latch-arms E beyond the pivotal point is of a peculiar curve, which is of great importance from the fact that it insures the positive operation of the latch-arms in locking or releasing the carriage and prevents the carriage from becoming accidentally released by the pressure upon the hoisting-ropes.

Guide-pins $i$ prevent the trip-lever D from being forced laterally to either side, thereby retaining it in a vertical or upright position when moving up or down.

The carriage C has connected to its lower end pulleys $k\ l$, grooved upon their periphery to receive a hoisting-rope, $m$. One end of the rope $m$ has connected to it a suitable plate, $n$, by means of which the end of the rope is fastened to the carriage C, at the same time admitting of its being drawn through the carriage for operating it at the other end of the barn, a plate of similar construction being secured to the opposite end of the rope when used as above stated. The rope $m$ passes over the pulley $l$ and extends down and under pulleys connected to the blocks F G, and thence extends up and over pulley $k$ and around pulleys $o\ p\ q$, secured to the barn, after which the rope passes around a vertical roller, $r$, secured at any suitable point outside the barn to bring the end of the hoisting-rope to which the team is connected back to its starting-point. The blocks F G have secured to their sides straps $s$, the straps upon the pulley-block G having detachably connected thereto a hooked arm, J, and to the straps of the pulley-block F a bracket, H, which is also detachably connected to said straps, so that the hooked arm and bracket can be removed and used upon either of the pulley-blocks, as circumstances may require when using the carriage at either end of the barn.

The hooked arm J may be of any suitable construction, and is hooked into the sling I, which supports the load to be elevated.

The bracket H, which may be of any desirable form and construction, has pivoted to it the inner end of a latch, K, for holding in position a hook or tripping-arm, L, one end of which is pivoted to the bracket, while its free end enters a hole or opening, $t$, in the latch K. This latch is retained in position to hold the tripping-hook L by a spring, $u$, but is caused to be disengaged from the end of the hook L by pulling on a rope, $v$, connected to the hook and passing over a pulley, $w$, which elevates the free end of the latch and releases the hook. After the load is secured by engaging the hooked arm J and the tripping-hook L with the spring I and the hook locked in position, as shown in Fig. 1, the load is elevated by drawing on the rope $m$. When the pulley-blocks F G have been raised to such height as to come in contact with the tripping-lever D they will force it up, which will in turn elevate the inner ends of the latch-arms E and depress or lower the outer or curved ends thereof. This movement of the latch-arms will bring the outer or curved ends on a line below the track B, and from contact with the inner end of the center timber or section, $e$, and end piece, $e'$, thereby enabling the carriage C to be moved along the track to bring the load over the place of deposit. After the load is removed from the sling I by releasing the tripping-hook L, as hereinbefore described, the weight M, attached to the lower end of a rope, $y$, will bring the carriage C back to its normal position, ready to take another load. As the carriage passes back over the track the outer or curved ends of the latch-arms E will be forced into position, as shown. The tripping-lever D, by its own weight, will fall and force the outer or curved ends of the latch-arms into the space $f$ between the timbers or sections $c\ d$ of the track. When in this position the end of the center timber or section, $e$, and end piece will prevent the carriage from moving in either direction until the curved ends of the latch-arms E are depressed in the manner hereinbefore described.

The rope $y$, to which the weight is attached, passes over a pulley, $a'$, and is connected to one end of the carriage in any suitable manner, the carriage, when moving along the track with its load, drawing the rope with it and elevating the weight.

In order to unlock the carriage C at any desirable point of elevation of the load independent of the action of the blocks F G against the tripping-lever D, I provide for this purpose the levers N, pivoted near their centers to the inner sides of the outer timbers or sections, $c\ d$, of the track B, and connect their inner ends with a rope, $b'$. By pulling on said rope it will raise the inner ends of the levers N and cause the outer ends to be pressed down against the outer or curved ends of the latch-arms E, thereby releasing them by forcing them on a line below the track B, when the carriage can be moved forward.

Having now fully described my invention, what I claim as new, and desire to secure by Letters Patent, is—

1. The track B, composed of the outer timbers or sections, $c\ d$, center timber or section, $e$, and having the space $f$, in combination with the carriage C, having pivoted latch-arms E, curved at their outer ends, as shown, the tripping-lever D, hangers $h$, pulleys $g\ k\ l$, and hoisting-rope $m$, constructed to operate substantially as and for the purpose set forth.

2. The carriage C, tripping-lever D, pivoted latch-arms E, curved at their outer ends, as shown, in combination with the track B, constructed as described, with the space $f$, and having pivoted thereto the levers N, operated by the rope $b'$, substantially as and for the purpose specified.

3. The track B and carriage C, constructed substantially as shown and described, in combination with the hoisting-rope $m$, pulley-blocks G F, having straps $s$ secured to their sides, and having detachably connected thereto the hooked arm J, bracket H, carrying pivoted tripping-hook L, latch K, with hole $t$, spring $u$, and rope $v$, and the sling I, constructed and arranged to operate substantially as and for the purpose described.

In testimony that I claim the above I have hereunto subscribed my name in the presence of two witnesses.

PETER F. CHAMBARD.

Witnesses:
JOHN G. SCHILLER,
WM. L. SPEIDEN.